US006456052B1

(12) United States Patent
Seitz

(10) Patent No.: US 6,456,052 B1
(45) Date of Patent: Sep. 24, 2002

(54) UNIVERSAL VOLTAGE FUEL DISPENSER

(75) Inventor: Gary L. Seitz, Decatur, IN (US)

(73) Assignee: Tokheim Corporation, Fort Wayne, IN (US)

(*) Notice: Subject to any disclaimer, the term of this patent is extended or adjusted under 35 U.S.C. 154(b) by 0 days.

(21) Appl. No.: 09/546,467

(22) Filed: Apr. 10, 2000

(51) Int. Cl.[7] ............................... H02J 3/12; G05F 1/59
(52) U.S. Cl. ........................ 323/355; 323/259; 307/139
(58) Field of Search ................................ 323/355, 250, 323/254, 222, 131, 358, 259; 363/20, 21, 49, 59, 143, 144, 146; 307/66, 118, 139

(56) References Cited

U.S. PATENT DOCUMENTS

| | | | | |
|---|---|---|---|---|
| 3,938,031 A | | 2/1976 | Blackmond | |
| 4,433,368 A | | 2/1984 | Choi | |
| 4,890,217 A | * | 12/1989 | Conway | 363/143 |
| 5,563,778 A | * | 10/1996 | Oh | 363/37 |
| 5,589,760 A | | 12/1996 | Lee | |
| 5,602,462 A | * | 2/1997 | Stich et al. | 363/101 |
| 5,661,348 A | | 8/1997 | Brown | |
| 5,874,787 A | * | 2/1999 | Meyer et al. | 307/39 |
| 6,055,521 A | * | 4/2000 | Ramsey et al. | 705/413 |

* cited by examiner

*Primary Examiner*—Rajnikant B. Patel
(74) *Attorney, Agent, or Firm*—Randall J. Knuth

(57) ABSTRACT

A fuel dispenser system is provided in a standard configuration based upon a single supply voltage requirement that is independent of the available local power supply sources. A supply voltage apparatus integrally coupled to the standard dispenser configuration employs a transformer to adapt the field supply voltage from the local power supply to the voltage level needed by the dispenser devices such as the power supplies.

33 Claims, 4 Drawing Sheets

UNIVERSAL VOLTAGE FUEL DISPENSER

BACKGROUND OF THE INVENTION

1. Field of the Invention

The present invention relates to an electrical apparatus for providing power supply signals to a fuel dispenser system, and, more particularly, to a supply voltage apparatus employing a transformer to convert the local supply voltage level to a power supply voltage level sufficient to power the devices of a universal fuel dispensing system.

2. Description of the Related Art

The design of industrial equipment intended for operation in multi-national environments must always take into account the different power supply levels that are available within individual countries. For example, a single region such as South America provides voltage levels of 110V, 127V, 220V, and 240V at frequencies of 50 Hz and 60 Hz. Clearly, the lack of compatibility between the available power supply level and the required operating voltage level of a machine assembly renders the machine assembly and any other machine-driven systems completely inoperable.

This problem arises most particularly with respect to the internal power supplies of any electrical-based system since the power supplies must receive the correct AC line voltage in order to generate the various DC signals typically needed to operate electrical devices such as computers and other related circuitry and apparatus. Modern machinery typically takes the form of electro-mechanical systems in which the electrical mechanisms provide the data and control signals needed to direct and otherwise manage the operations of the mechanical subsystems. However, if insufficient or inadequate AC supply voltages are provided to the power supply units, the mechanical or work-producing components become inoperable since the control system is non-functioning due to the absence of suitable powering of the electrical apparatus.

One conventional approach to addressing this problem of different regional supply voltage levels has involved customizing the machinery to the existing power supply source available within a specific region, thereby limiting the product to the particular regional destination in which it will be installed and operated. This product development strategy, however, presents significant drawbacks in terms of requiring a manufacturing capacity that will support a dedicated product line for each of the multiple versions of a product, which essentially perform the same function and purpose. Each of the product versions will have its supply voltage requirements tailored to the particular power supply source that is available in the destination (i.e., region or country) where the product is designated for sale and installation. The profitability, productivity, and efficiency of such a customizing strategy are very limited.

Based upon the conventional approach outlined above, the development of fuel dispensers would involve the use of power supply assemblies having operating voltage level requirements that match the field voltage of the local power source. What is needed, however, is a design strategy that eliminates this degree of dependence upon the local field voltage in providing a fuel dispenser apparatus, particularly with respect to the construction of the internal power supplies.

SUMMARY OF THE INVENTION

According to the present invention there is provided a fuel dispensing system having a standardized construction requiring a universal supply voltage level. This standard configuration, in its various forms disclosed herein, employs a supply voltage apparatus that adapts the local field supply voltage to the supply voltage level associated with the fuel dispensing equipment. In this manner, the fuel dispenser can be designed according to a single architecture in which the power supplies can operate, for example, at a designated universal voltage level regardless of the field supply voltage.

In one standard configuration, a transformer is provided to convert the field supply voltage to an output voltage signal having a voltage level equal to the supply voltage level required by the power supplies. The transformer is designed specifically to perform the appropriate voltage level conversion and is preferably of the step-down type. A common node terminal strip couples the transformer output side to the input lines of the power supply assembly. Other devices which operate directly from AC power can receive the transformer output signal via the common node terminal strip.

In another standard configuration, a transformer is also provided to convert an input signal provided by the local power supply source into an output signal. Unlike the first standard fuel dispensing configuration, the power supply assembly of this standard arrangement is selectively configurable for connection with either the transformer or local power supply source depending upon the value of the field voltage level relative to the power supply requirements of the fuel dispenser. For this purpose, the power supplies are provided with selectively activatable multiple primary windings. More particularly, when the field voltage level equals the dispenser power supply requirements, the individual power supplies are appropriately configured via their primary winding arrangement so as to establish a parallel circuit connection with the local power supply source, thereby coupling the field voltage to the power supplies. Alternately, when the field voltage level is different from the dispenser power supply requirements (i.e., the power supply requirement is greater than the field voltage), the individual power supplies are appropriately configured via their primary winding arrangement so as to establish a series circuit connection with the transformer at its output side, thereby enabling the power supplies to derive the proper input supply voltage level from the transformer output signal.

In another standard configuration, a transformer is likewise provided to convert an input voltage at an input voltage level (and received from a local power supply source) into an output voltage signal at an output voltage level. The power supply assembly may be provided in various voltage configurations, namely a multi-level arrangement or a single-level design. A signal processor is provided to generate the various required voltage level signals based upon the transformer output signal. A switch assembly routes and otherwise distributes the voltage level signals to the appropriate power supply devices.

The invention, in one form thereof, is directed to a system that include s a fuel dispenser assembly operative at a first voltage level. A transformer assembly is operative to convert an input voltage signal at an input voltage level into an output voltage signal at an output voltage level substantially equal to the first voltage level. A coupling assembly is arranged to operatively couple the output voltage signal provided by the transformer assembly to the fuel dispenser assembly. In a preferred form, the first voltage level includes an AC characteristic and the transformer output voltage level includes an AC characteristic. Additionally, the transformer input voltage level is typically greater than the transformer output voltage level, indicating the use of a step-down transformer.

The fuel dispenser assembly further includes at least one power supply device that is operatively coupled to the output side of the transformer assembly via the coupling assembly. The coupling assembly further includes a common node terminal arrangement that operatively couples the output side of the transformer assembly to the power supply devices.

The invention, in another form thereof, is directed to a system for use in powering equipment at a fuel dispensing location that includes a fuel dispenser assembly. The fuel dispenser assembly is operative at a first voltage level. A conversion means converts an input voltage signal at an input voltage level into an output voltage signal at an output voltage level substantially equal to the first voltage level. A coupling means operatively couples the output voltage signal provided by the conversion means to the fuel dispenser assembly.

The conversion means further includes a transformer assembly having an input side and an output side, while the coupling means further includes a common node terminal arrangement that operatively couples the output side of the transformer assembly to the fuel dispenser assembly. The fuel dispenser assembly further includes a power supply assembly that is operatively coupled to the output side of the transformer assembly via the common node terminal arrangement.

The invention, in another form thereof, is directed to a system for use with a local power supply source that provides a source voltage signal. A fuel dispenser assembly includes a power supply assembly comprising at least one power supply device. Each power supply device includes a selectively configurable input circuit mechanism having input lines. The input circuit mechanism enables an input supply voltage to be operatively developed for the associated power supply device based upon the selected configuration of the input circuit mechanism and the voltage signals operatively present on the input lines. The system further includes a transformer assembly having an input side operatively coupled to the local power supply source and an output side. A coupling assembly is operatively coupled to the transformer assembly at the output side thereof and is operatively coupled to the local power supply source. The coupling assembly is suitably arranged for operative connection with the power supply assembly so as to enable the power supply devices to be selectively connectable to at least one of the local power supply source and the transformer output side. Each power supply device is preferably provided in a form having a plurality of selectively activatable primary winding leads.

During operation, when the voltage level of the source voltage signal provided by the local power supply source substantially equals an operating voltage level of the power supply assembly, the associated input circuit mechanism of each power supply device is selectively configured into a parallel circuit connection with the local power supply source via the coupling assembly. Alternatively, when the voltage level of the source voltage signal provided by the local power supply source does not substantially equal an operating voltage level of the power supply assembly, the associated input circuit mechanism of each power supply device is selectively configured into a series connection with the transformer assembly at the output side thereof via the coupling assembly.

The invention, in another form thereof, is directed to a system comprising a fuel dispenser assembly having at least one operating voltage level. A transformer assembly is operative to convert an input voltage signal at an input voltage level into an output voltage signal at an output voltage level. The system further includes an input assembly which comprises, in combination, a first assembly and a second assembly. The first assembly, which is responsive to the output voltage signal provided by the transformer assembly, provides supply voltage signals each having a respective voltage level. The second assembly is arranged to operatively couple the supply voltage signals to the fuel dispenser assembly for operative powering thereof.

The fuel dispenser assembly further comprises a power supply assembly including at least one power supply device each operative at an associated power supply voltage level. The first assembly provides supply voltage signals having respective voltage levels that are substantially equal to the power supply voltage levels of the power supply devices. The second assembly is arranged to couple each one of the supply voltage signals provided by the first assembly to a corresponding one of the power supply devices. In one form, the first assembly and second assembly are respectively provided in the form of a voltage processor and a switch assembly.

The invention, in yet another form thereof, is directed to a method of powering a fuel dispenser assembly operative at a first voltage level with a power supply source which provides voltage at a second voltage level. According to the method, an input voltage signal received from the power supply source is converted into an output voltage signal having a voltage level substantially equal to the first voltage level. The fuel dispenser assembly is then powered with this output voltage signal. The voltage conversion is preferably performed with a transformer. The fuel dispenser assembly preferably includes a power supply assembly, which involves coupling the output side of the transformer to the power supply assembly. This coupling is provided by a common node connection.

The invention, in yet another form thereof, is directed to a method of powering a fuel dispenser assembly having at least one operating voltage level. According to the method, an input voltage signal at an input voltage level is converted into an output voltage signal at an output voltage level. This output voltage signal is then suitably processed to provide at least one supply voltage signal each having a respective voltage level. The fuel dispenser assembly is then powered with these supply voltage signals. The voltage conversion is preferably performed by a transformer. The fuel dispenser assembly preferably includes a power supply assembly, such that the powering step further involves coupling the output side of the transformer to the power supply assembly.

The invention, in still yet another form of the invention, is directed to a method of powering a fuel dispenser assembly including at least one power supply device each being operative at an associated power supply voltage level. According to the method, an input voltage signal at an input voltage level is converted into an output voltage signal at an output voltage level. This output voltage signal is then suitably processed to provide at least one supply voltage signal each having a respective voltage level substantially equal to the respective power supply voltage levels of the power supply devices. The fuel dispenser assembly is subsequently powered by coupling each respective one of the supply voltage signals to a corresponding one of the power supply devices. A transformer is provided to perform the voltage conversion.

One advantage of the present invention is that the standard configuration of the fuel dispenser assembly eliminates the vast manufacturing activity otherwise needed in conventional systems where the design of the fuel dispenser is tailored to the available field supply voltage.

Another advantage of the present invention is that the standard fuel dispenser configuration can be assembled independently of any design issues related to the particular field voltage values of the local power supply source; only the transformer is subject to adaptive construction vis-a-vis the local power supply source.

Another advantage of the present invention is that the supply voltage apparatus can be easily integrated into current fuel dispenser installations since full connectivity only requires suitable interfacing to the local power supply (i.e., from the transformer input) and to the fuel dispenser operating devices (i.e., from the coupling assembly that delivers the transformer output signal).

A further advantage of the invention is that the process of adapting the standard fuel dispenser configuration to the local power supply source simply involves assembling the configuration with the proper transformer.

A yet further advantage of the invention is that the standard fuel dispenser configuration can be made available for use throughout the world without any of the conventional concerns regarding voltage level compatibility, provided that the configuration has been simply equipped with the appropriate transformer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
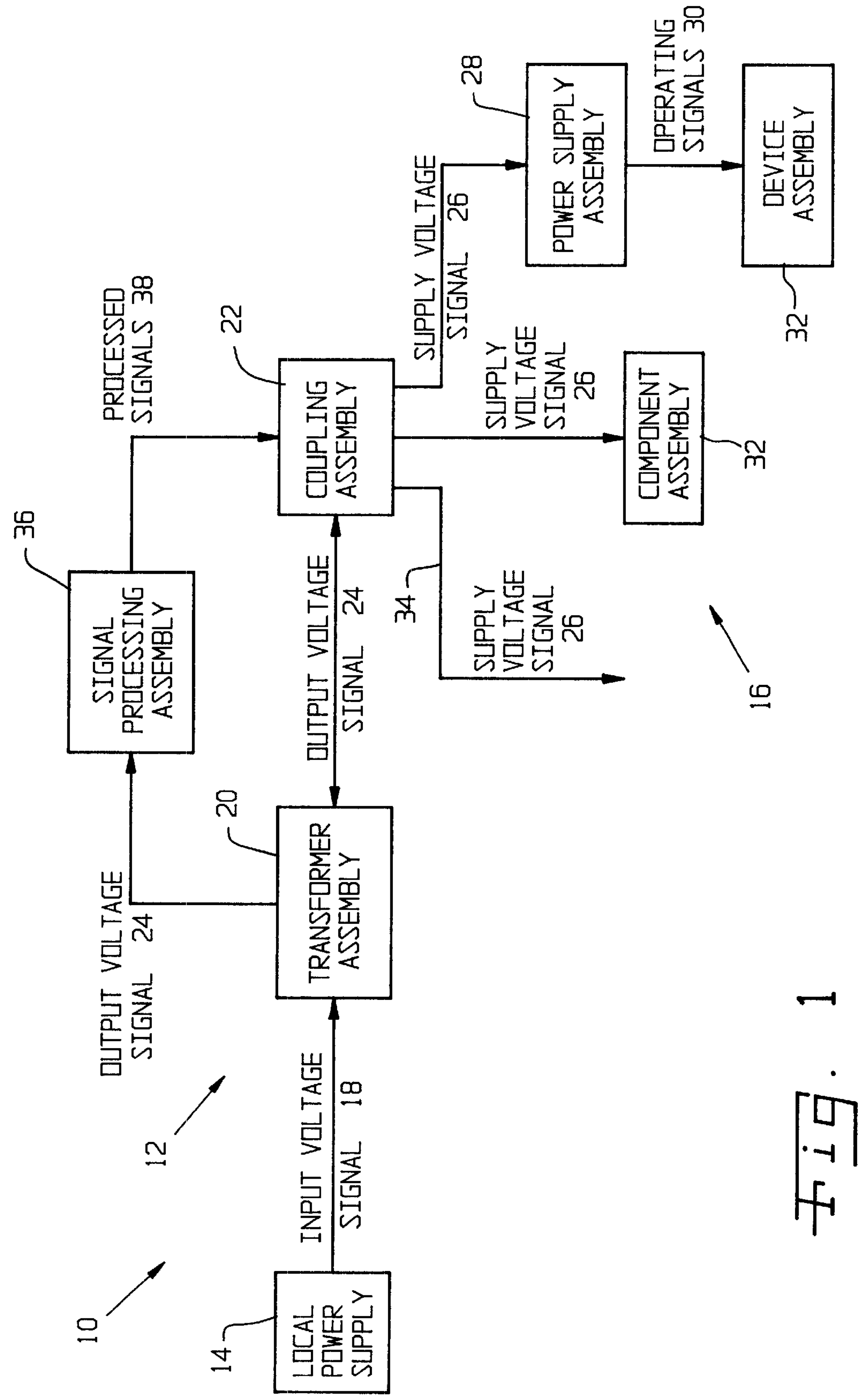
FIG. 1 is a schematic block diagram illustration of a supply voltage apparatus for use in a fuel dispenser system in accordance with the present invention.

Referring now to the drawings and particularly to FIG. 1, there is shown a block diagram illustration of a fuel dispensing system 10 according to the present invention which includes a supply voltage apparatus (generally illustrated at 12) responsive to the input voltage signal 18 provided by a local power supply 14 for generating the supply voltage signals needed to power a fuel dispenser device assembly (generally illustrated at 16). As explained in further detail, supply voltage apparatus 12 is adaptively designed to enable fuel dispenser device assembly 16 to be configured according to a standardized, universal construction having a universal operating voltage level. As noted previously, the regional supply sources typically provide signals at voltage levels that are mismatched to the voltage levels needed to operate the fuel dispenser equipment. However, in accordance with the present invention, supply voltage apparatus 12 converts the input voltage signal 18 provided by local power supply 14 into an output voltage signal at a voltage level which matches the power supply requirements of the fuel dispenser. In this manner, the standardized fuel dispenser configuration is adapted for use with the regional power supply source by means of supply voltage apparatus 12. Consequently, the universal fuel dispenser can be powered by any type of regional power supply (i.e., any external supply voltage level) since supply voltage apparatus 12 can be suitably adapted to perform the appropriate voltage conversion.

The illustrated supply voltage apparatus 12 includes a transformer assembly 20 operatively connected to local power supply 14, and a coupling assembly 22 operatively connected at one end to transformer assembly 20 and at another end to fuel dispenser device assembly 16. Transformer assembly 20 functions in a conventional manner to convert input voltage signal 18 provided by power supply 14 at an input voltage level into an output voltage signal 24 at an output voltage level. The voltage conversion characteristics of transformer assembly 20 are chosen such that the transformer output voltage level substantially equals the dispenser operating voltage level associated with fuel dispenser device assembly 16. Transformer assembly 20, for example, may be suitably adapted to convert input voltage levels of 220 VAC and 240 VAC at frequencies of 50 Hz and 60 Hz into universal fuel dispenser operating voltage levels of 110 VAC and 120 VAC, respectively, at frequencies of 50 Hz and 60 Hz. These particular voltage levels are merely illustrative and should not be considered in limitation of the present invention as it should be apparent that other input-output voltage level conversions can be performed according to the present invention.

The illustrated coupling assembly 22 serves as a means by which output voltage signal 24 provided by transformer assembly 20 is delivered to dispenser assembly 16 as supply voltage signals 26. Coupling assembly 22 can be implemented with any conventional arrangement suitable for coupling such voltage signals and for providing the appropriate interface connection. For example, coupling assembly 22 can be a passive arrangement such as a common node terminal strip or may include an active device such as a combined signal conditioner and transmission unit arranged to condition output voltage signal 24 and prepare it for transmission to dispenser assembly 16.

As shown, the illustrated dispenser assembly 16 includes a power supply assembly 28 responsive to supply voltage signal 26 received from coupling assembly 22 for generating operating signals 30 suitable to operate a device assembly 32. For example, power supply assembly 28 may comprise a conventional arrangement of individual power supplies that operate in a known manner to change an AC input voltage (i.e., supply voltage signal 26) into a DC output voltage (i.e., operating signal 30) suitable for activating, controlling, and otherwise operating device assembly 32. Device assembly 32 may include conventional fuel dispenser devices such as control valves and customer interface modules such as touch-screen displays and transaction processing equipment. This catalog of devices for device assembly 32 is provided for illustrative purposes only and should not be considered in limitation of the present invention as it should be apparent that any arrangement of fuel dispenser devices can be installed for use with the present invention.

Fuel dispenser assembly 16 also includes a component assembly 32 that is powered directly by supply voltage signal 26. Component assembly 32 may include, without limitation, a heater element and service station lights. Signal line 34 is provided to deliver supply voltage signal 26 to any other equipment associated with the service station site. It should be apparent that the fuel dispenser device assembly 16 is provided in illustrative form only and should not be considered in limitation of the present invention as other arrangements may be provided for use with supply voltage apparatus 12.

According to one aspect of the present invention, fuel dispenser device assembly 16 operates in accordance with a single AC operating voltage level such as 110 VAC at 60 Hz. The illustrated supply voltage apparatus 12 accommodates this requirement by employing transformer assembly 20 to convert the input voltage signal 18 (e.g., 220 VAC) into output voltage signal 24 at the required voltage level of 110 VAC. In such an arrangement, the individual power supplies of power supply assembly 28 would require the same input supply voltage level (i.e., 110 VAC).

In certain applications, however, there may arise the need to implement power supply assembly 28 with a plurality of power supply devices having different input voltage requirements. Supply voltage apparatus 12 may then optionally include a signal processing assembly 36 that is responsive to output voltage signal 24 received from transformer assembly 20 to provide processed signals 38, which represent supply voltage signals having voltage levels that correspond to the various voltage levels required by fuel dispenser device assembly 16 (e.g., power supply assembly 28). Coupling assembly 22 would then be provided with the capability or facility to route the various voltage level supply signals to the appropriate ones of the power supply devices.

It is a preferred feature of the present invention that supply voltage apparatus 12 be housed in a field junction box equipped with suitable interface units defining an input end and an output end. The input end would serve as the connection point between the output of local power supply 14 and the input side of transformer assembly 20, while the output end would serve as the connection point between the output side of coupling assembly 22 and the input terminal arrangement for fuel dispenser device assembly 16. In this manner, full connectivity would be accomplished by simply making the appropriate connections from local power supply 14 to the input interface connection and from fuel dispenser device assembly 16 to the output interface connection. No internal connections or re-wiring would have to be done within supply voltage apparatus 12, enabling ease of installation and integration. The illustrated fuel dispenser assembly 16 would typically be housed at least in part within an electronics enclosure area as well known in the art.

Figure 2:
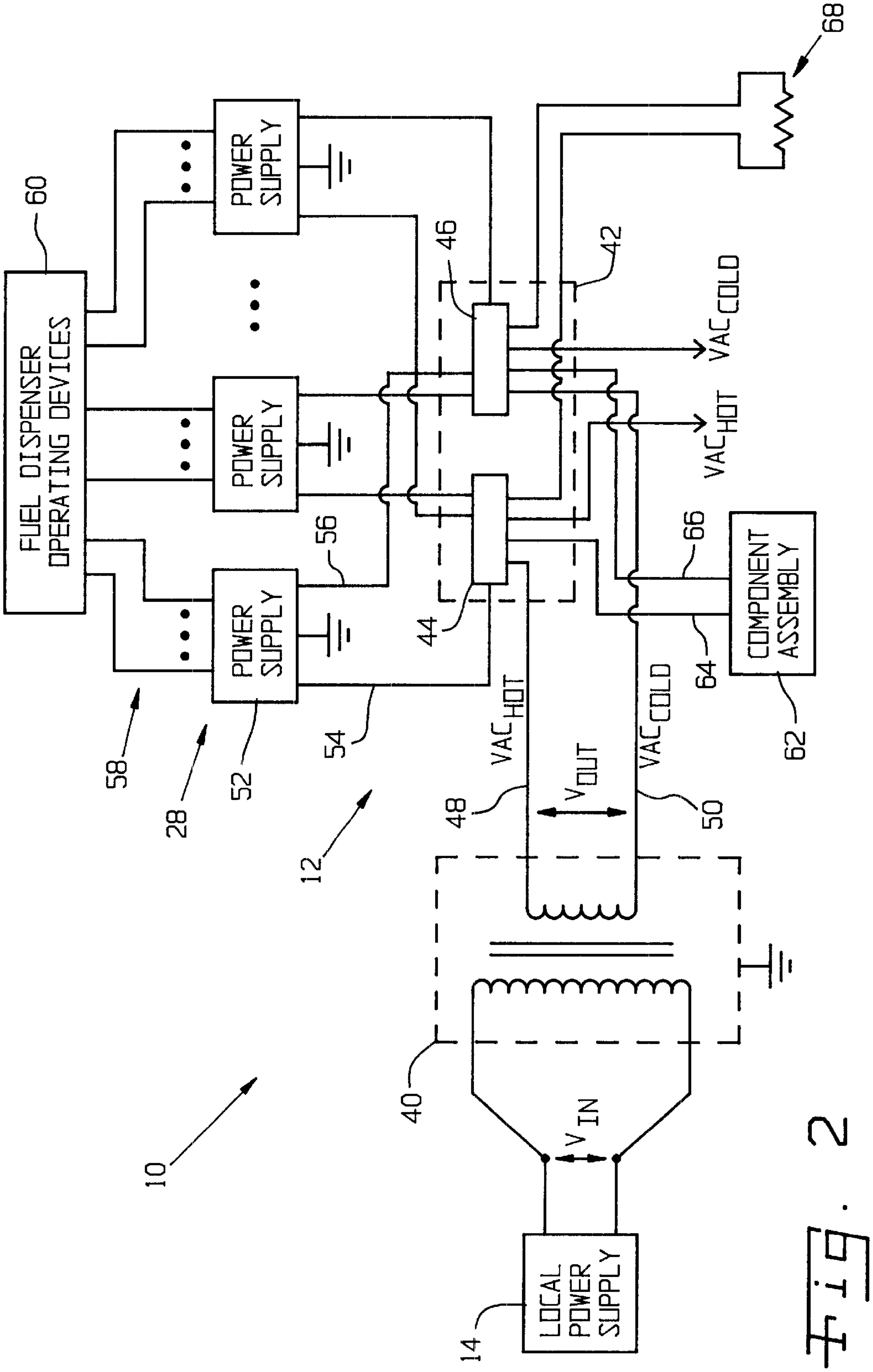
FIG. 2 is a schematic block diagram illustration of a supply voltage apparatus for use in a fuel dispenser system according to a first embodiment of the present invention.

Referring now to FIG. 2, there is shown a block diagram illustration of a supply voltage apparatus 12 for use in a fuel dispenser system 10 according to a first embodiment of the present invention. As described in further detail, this first embodiment of the present invention involves a fuel dispenser assembly which is operative at a common supply voltage level. Supply voltage apparatus 12 is therefore arranged and otherwise adapted to generate an output voltage signal having a voltage level substantially equal to this common operating voltage level.

The illustrated supply voltage apparatus 12 shown in FIG. 2 includes a transformer 40 of conventional form which converts an input signal ($V_{IN}$) at an input voltage level (provided by local power supply source 14) into an output signal ($V_{OUT}$) at an output voltage level. The output voltage level substantially equals the operating voltage level of the fuel dispenser assembly. The particular design of transformer 40 (i.e., its voltage conversion characteristics) is therefore chosen to ensure that transformer 40 outputs the required supply voltage level based upon the voltage requirements of the universal fuel dispenser configuration, namely the common operating voltage level. In one illustrative implementation, transformer 40 is a step-down transformer of conventional design providing a voltage conversion from 220 VAC to 110 VAC, for example.

The illustrated supply voltage apparatus 12 further includes a common node terminal strip or arrangement 42 having a first common node 44 and a second common node 46 respectively coupled to output lines 48 and 50 of transformer 40. These transformer output lines 48 and 50 respectively carry a "hot" AC voltage level signal ($VAC_{HOT}$) and a "cold" AC voltage level signal ($VAC_{COLD}$) having a potential difference corresponding to $V_{OUT}$. Terminal strip 42 effectively serves as a coupling mechanism by which the output signals from transformer 40 can be connected in common to any of various devices.

As shown, power supply assembly 28 includes a plurality of individual power supply devices 52 each having a pair of input supply voltage lines 54 and 56 respectively coupled to first common node 44 and second common node 46 of common node terminal strip 42. Power supply 52 also includes output lines generally indicated at 58 that provide operating voltage signals (e.g., DC level signals) to fuel dispenser operating devices 60 such as control valves, communications devices, speaker/call box, drive motor, and other such components.

The fuel dispenser assembly may also include a component assembly 62 having input supply voltage lines 64 and 66 respectively connected to first common node 44 and second common node 46 of common node terminal strip 42. Component assembly 62 represents devices and other functional apparatus that operate directly from the AC voltage level signal provided by transformer 40. An optional heater element 68 may be provided that receives its voltage input as shown from common node terminal strip 42.

Transformer 40 and common node terminal strip 42 are preferably integrally provided in a field junction box equipped with an input interface coupled to the input side of transformer 40, and an output interface coupled to the first common node 44 and second common node 46 of terminal strip 42. This modular construction enables ease of installation and system hook-up since full connectivity requires only that transformer 40 be connected at its input side to local power supply 14 and that the fuel dispenser assembly be connected to terminal strip 42 via a suitable electrical connection. As a fully configured unit, supply voltage apparatus 12 requires no internal wiring changes or other such re-configuring in order to be functionally integrated with local power supply 14 and the fuel dispenser assembly.

Figure 3:
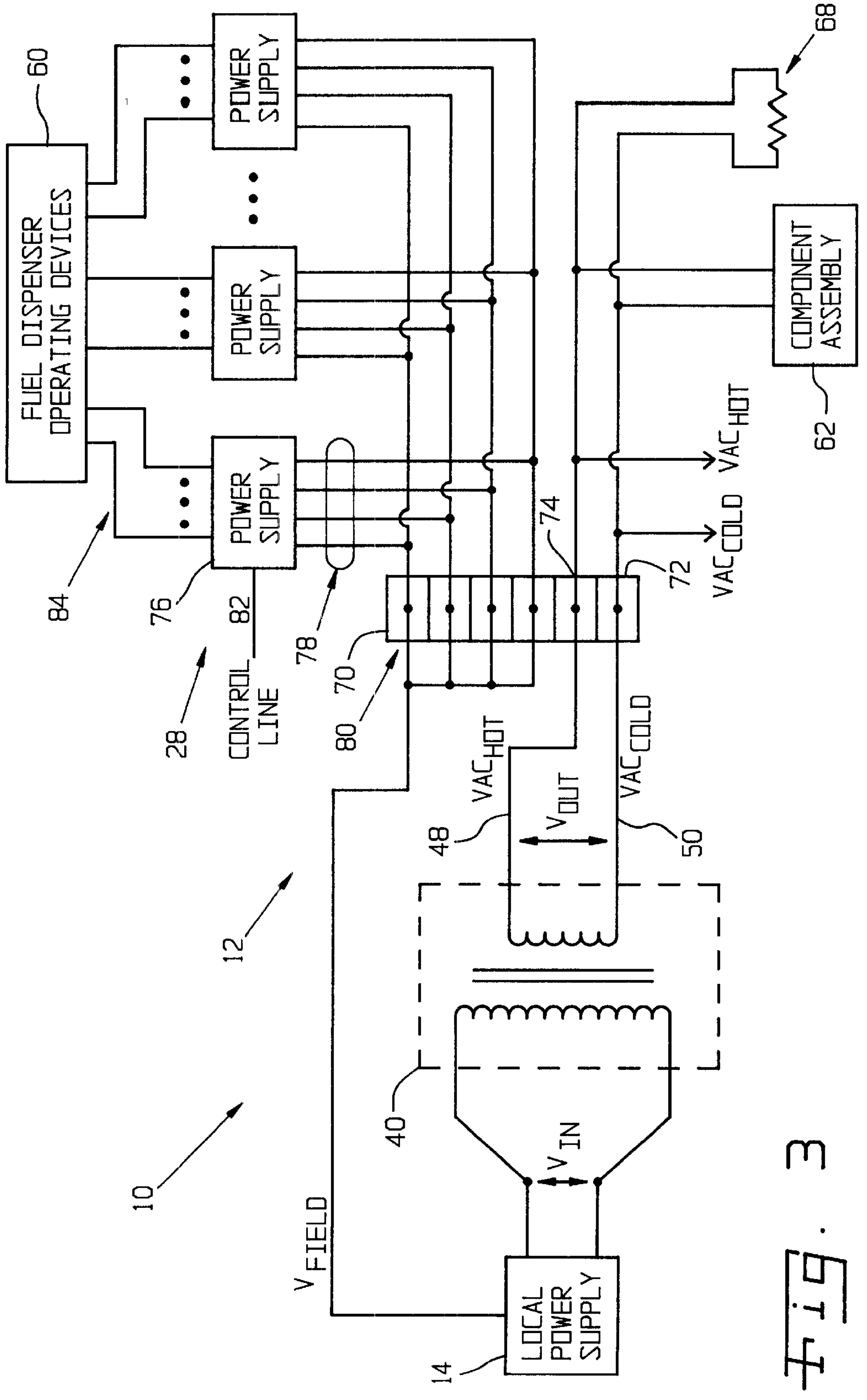
FIG. 3 is a schematic block diagram illustration of a supply voltage apparatus for use in a fuel dispenser system according to a second embodiment of the present invention.

Referring now to FIG. 3, there is shown a block diagram illustration of a supply voltage apparatus 12 for use in a fuel dispenser system 10 according to a second embodiment of the present invention. As described in further detail, this second embodiment involves a fuel dispenser assembly having internal power supplies which are selectively connectable to either the local power supply source or the transformer depending upon the value of the field supply voltage (provided by the local power supply source) relative to the operating voltage level required by the dispenser power supplies. The transformer is therefore utilized vis-a-vis the dispenser power supply assembly only when the operating voltage level of the internal power supplies is different from the field supply voltage level. In these circumstances, the dispenser power supply assembly is provided with a facility to derive the necessary input supply voltage signals from the output signal provided by the transformer.

The illustrated supply voltage apparatus 12 shown in FIG. 3 includes a transformer 40 of conventional form which converts an input signal ($V_{IN}$) at an input voltage level into an output signal ($V_{OUT}$) at an output voltage level. This input signal ($V_{IN}$) corresponds to the source voltage signal ($V_{FIELD}$) produced by field or local power supply source 14. In one illustrative implementation, transformer 40 is a step-down transformer of conventional design providing a voltage conversion from 220 VAC to 110 VAC, for example, although any other such voltage conversion is possible within the scope of the present invention.

The illustrated supply voltage apparatus 12 further includes a multi-node field wiring terminal strip 70 having a first node 72 and a second node 74 respectively coupled to output lines 48 and 50 of transformer 40. These transformer output lines 48 and 50 respectively carry a "hot" AC voltage level signal ($VAC_{HOT}$) and a "cold" AC voltage level signal ($VAC_{COLD}$) having a potential difference corresponding to $V_{OUT}$, i.e., the voltage produced by transformer 40. Terminal strip 70 functions in a known manner to establish a connection arrangement between transformer 40 and any devices, apparatus, or other such mechanisms coupled to terminal strip 70.

As shown, the illustrated power supply assembly 28 includes a plurality of individual power supplies 76 each having a plurality of selectively activatable input supply voltage lines 78 preferably provided in the form of a multiple primary winding or lead arrangement of conventional construction. These primary windings 78 preferably define, at least in part, a selectively configurable input circuit mechanism whose input lines are associated with a particular power supply 76. The input circuit mechanism is arranged to enable an input supply voltage to be operatively developed for the respective power supply 76 based upon the selected configuration of the input circuit mechanism and the voltage signals operatively present on primary windings 78. For example, as discussed in further detail, the input circuit mechanism may be alternately configured for a parallel or series circuit connection with other devices via primary windings 78.

The illustrated field wiring terminal strip 70 further includes a set of terminal nodes (generally illustrated at 80 as a group of four nodes) that are selectively connectable to either local power supply 14 or to the output side of transformer 40. As shown, each of the primary windings 78 is connected to a respective one of the terminal nodes 80 of field wiring terminal strip 70. Accordingly, each power supply 76 is able to be selectively connectable with either one of local power supply 14 or transformer 40. As discussed below, the particular type of connectivity for power supply 76 is determined at least in part by the configuration that is chosen for the input circuit mechanism (i.e., primary windings 78) of power supply 76. The implementation represented by terminal strip 70 should not be considered in limitation of the present invention as it should be apparent that this arrangement is representative of any coupling assembly providing connectivity to both local power supply 14 and transformer 40 or to any other desired devices, mechanisms, or systems as conventionally understood.

During operation, primary windings 78 are configured in a manner determined by the value of the field voltage $V_{FIELD}$(provided by local power supply source 14) relative to the operating supply voltage level required by power supply 76. More particularly, when the voltage level of the field voltage signal provided by local power supply source 14 substantially equals the operating voltage level required by power supply 76, primary windings 78 are selectively configured into a parallel circuit connection with local power supply source 14 via terminal strip 70. This parallel arrangement has the effect of coupling the field supply voltage ($V_{FIELD}$) to power supply 76 as the input supply voltage. Alternatively, when the voltage level of the field voltage signal provided by local power supply source 14 does not substantially equal the operating voltage level required by power supply 76 (e.g., the required voltage level is greater than the field voltage level), primary windings 78 are selectively configured into a series circuit connection with the output side of transformer 40 via terminal strip 70. This serial arrangement enables power supply 76 to derive the needed input supply voltage from the transformer output signal ($V_{OUT}$). The manner of activating the appropriate ones of the individual primary windings 78 in accordance with the selected configuration (i.e., series or parallel connection) may be provided in any conventional fashion, such as by control line 82 of power supply 76 or any other suitable control mechanism.

In a manner similar to the embodiment shown in FIG. 2, power supply 76 of FIG. 3 also includes output lines generally indicated at 84 that provide operating voltage signals (e.g., DC level signals) to fuel dispenser operating devices 60 such as control valves and other electrical components. Additionally, the fuel dispenser assembly may also include a component assembly 62 representing equipment that can operate directly from the AC voltage level signal provided by transformer 40. An optional heater element 68 may also be provided.

Transformer 40 and field wiring terminal strip 70 are likewise preferably integrated as a modular unit within a field junction box equipped with an input interface coupled to the input side of transformer 40, and an output interface coupled to terminal strip 70. This modular construction enables ease of installation and system hook-up since full connectivity requires only that local power supply 14 be connected to transformer 40 and terminal strip 70 in the manner shown, and that the fuel dispenser assembly be connected to terminal strip 70 via a suitable electrical connection. As a fully configured unit, supply voltage apparatus 12 requires no internal wiring changes or other such hardwire re-configurations in order to be functionally integrated with local power supply 14 and the fuel dispenser assembly.

Figure 4:
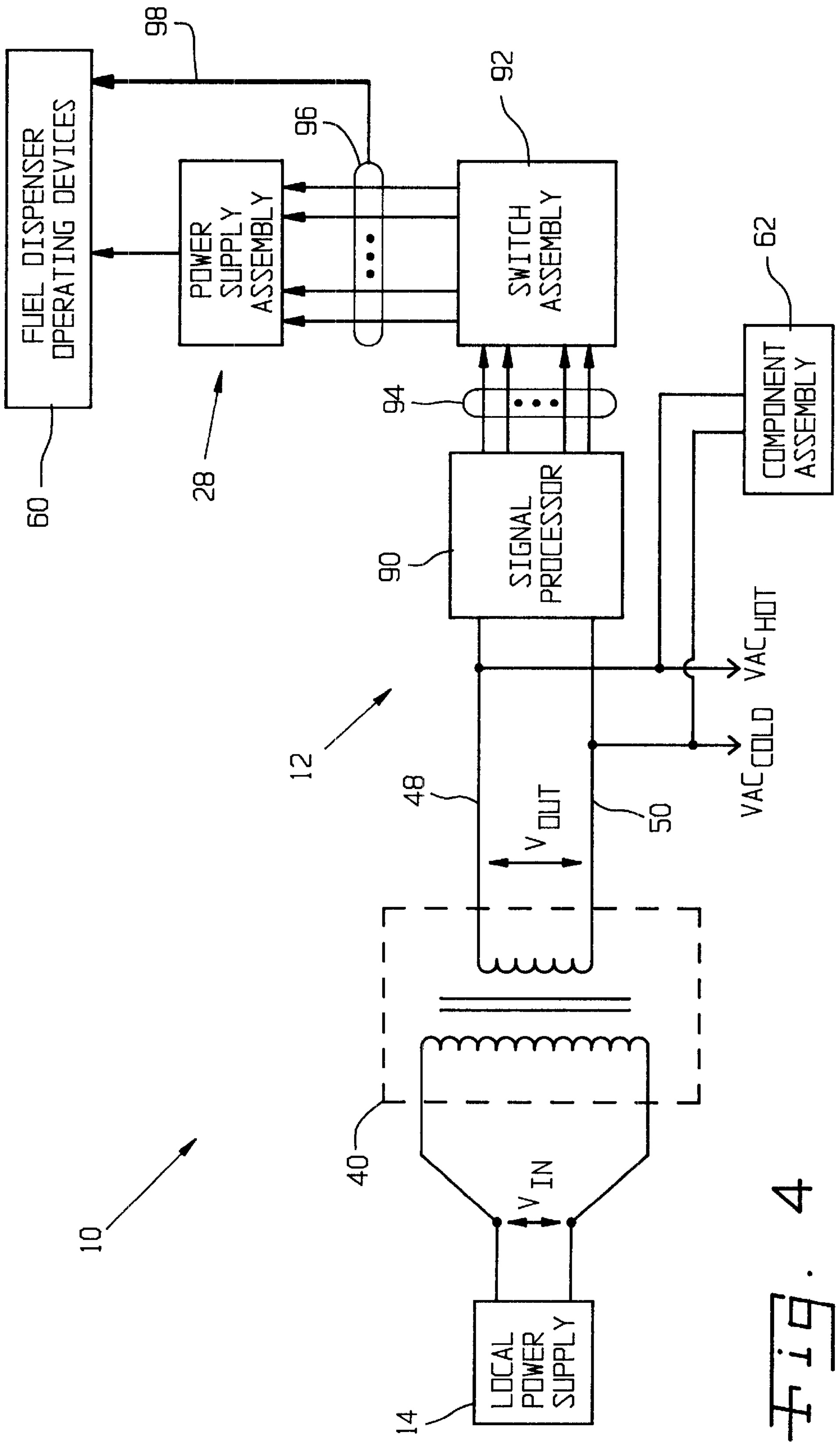
FIG. 4 is a schematic block diagram illustration of a supply voltage apparatus for use in a fuel dispenser system according to a third embodiment of the present invention.

Referring now to FIG. 4, there is shown a block diagram illustration of a supply voltage apparatus 12 for use in a fuel dispenser system 10 according to a third embodiment of the present invention. As described in further detail, this third embodiment may be used in conjunction with a fuel dispenser assembly having internal power supplies with various supply voltage level requirements or, alternately, a common supply voltage level requirement that is different from the voltage level of the transformer output signal. Supply voltage apparatus 12 is designed to enable the output voltage signal from the transformer to be selectively processed and otherwise modified so as to generate an associated supply voltage signal for each individual power supply unit which satisfies the particular voltage level requirement of the power supply.

The illustrated supply voltage apparatus 12 includes transformer 40 operatively coupled at an input side to receive the field voltage signal provided by local power supply 14, in a manner similar to the previous embodiments. According to this third embodiment of the present invention, supply voltage apparatus 12 further includes a signal processor 90 and a switch assembly 92. Signal processor 90 is responsive to the output voltage signal ($V_{OUT}$) provided by transformer 40 for controllably generating a plurality of supply voltage signals 94 having voltage levels corresponding to the voltage level requirements of fuel dispenser power supply assembly 28. These supply voltage signals 94, in particular, are derived from the transformer output voltage signal ($V_{OUT}$).

The illustrated power supply assembly 28 may be provided, in one form thereof, in a multi-level supply voltage configuration having at least two power supplies with different supply voltage levels that are themselves distinct from the transformer output voltage level. In this case, supply voltage signals 94 generated by signal processor 90 will include the appropriate number of signals having the variously required voltage levels. Alternately, power supply assembly 28 may be provided in a single-level supply voltage configuration in which the power supplies require a common supply voltage level distinct from the transformer output voltage level. In this case, supply voltage signals 94 will have a common voltage level. Each of the above-cited configurations may also include at least one power supply that requires the same supply voltage level as present within the transformer output voltage.

The illustrated switch assembly 92 performs a signal routing and distribution function in which the supply voltage signals 94 generated by signal processor 90 are suitably routed and otherwise delivered as input supply voltage signals 96 to appropriate ones of the power supplies in power supply assembly 28. Additionally, if any fuel dispenser components operate on AC power, AC voltage signals 96 can be provided over line 98 to any such components of fuel dispenser operating devices 60. Signal processor 90 and switch assembly 92 are shown for illustrative purposes only as it should be apparent that the functions performed by each can be implemented in various other ways known to those skilled in the art.

The arrangement comprising transformer 40, signal processor 90, and switch assembly 92 are preferably integrated as a modular unit within a field junction box equipped with an input interface coupled to the input side of transformer 40 and an output interface coupled to switch assembly 92.

In the embodiments disclosed herein, there may optionally be included the use of DC powered devices to replace AC powered devices designed, for example, for either 50 Hz or 60 Hz to eliminate frequency sensitivity. One example is the replacement of hot cathode fluorescent lighting fixtures with cold cathode lighting devices using DC powered frequency inverters.

What has been disclosed is a fuel dispenser of common design, which can be adapted to various supply voltages and frequencies. The universal or standard design would be configured to be compatible with a single voltage source and then adapted to the local supply (if necessary) with a transformer installed in a universal junction box. A universal junction box would house the connection points for dispenser AC, dispenser communications, speaker intercom connections, motor power, and the adapting transformer.

By creating a standard or common voltage design, the number of configurations required by the varying local power sources can be dramatically reduced. No longer would it be necessary to purchase and inventory control valves and blend valves of different voltages, lamp-ballast and contactors, as well as multiple assemblies specifically produced to accommodate different voltages.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system, comprising:

a fuel dispenser assembly being operative, at least in part, at a first voltage level;

a transformer assembly being operative to convert an input voltage signal at an input voltage level into an output voltage signal at an output voltage level substantially equal to said first voltage level; and a coupling assembly arranged to operatively couple the output voltage signal provided by said transformer assembly to said fuel dispenser assembly.

2. The system as recited in claim 1, wherein said fuel dispenser assembly further comprises:

at least one power supply device operatively coupled to the output side of said transformer assembly via said coupling assembly.

3. The system as recited in claim 2, wherein said coupling assembly further comprises:

a common node terminal arrangement operatively coupling the output side of said transformer assembly to said at least one power supply device.

4. The system as recited in claim 1, wherein said coupling assembly comprises:

a common node terminal arrangement operatively coupling the output side of said transformer assembly to said fuel dispenser assembly.

5. The system as recited in claim 1, wherein said first voltage level includes an AC characteristic and said transformer output voltage level includes an AC characteristic.

6. The system as recited in claim 1, wherein said transformer input voltage level is greater than said transformer output voltage level.

7. A system for use in powering equipment at a fuel dispensing location including a fuel dispenser assembly, said fuel dispenser assembly being operative, at least in part, at a first voltage level, said system comprising:

conversion means for converting an input voltage signal at an input voltage level into an output voltage signal at an output voltage level substantially equal to said first voltage level; and coupling means for operatively coupling the output voltage signal provided by said conversion means to said fuel dispenser assembly.

8. The system as recited in claim 7, wherein said conversion means further comprises:

a transformer assembly having an input side and an output side.

9. The system as recited in claim 8, wherein said coupling means further comprises:

a common node terminal arrangement operatively coupled to the output side of said transformer assembly and operatively coupled to said fuel dispenser assembly.

10. The system as recited in claim 9, wherein said fuel dispenser assembly further comprises:

a power supply assembly operatively coupled to the output side of said transformer assembly via said common node terminal arrangement.

11. A system for use with a local power supply source providing a source voltage signal, comprising:

a fuel dispenser assembly including a power supply assembly comprising at least one power supply device, each respective one of said at least one power supply device including an associated selectively configurable input circuit mechanism having input lines, said associated input circuit mechanism enabling an input supply voltage to be operatively developed for said respective one power supply device based upon the selected configuration of said input circuit mechanism and the voltage signals operatively present on said input lines;

a transformer assembly having an input side operatively coupled to said local power supply source and having an output side; and a coupling assembly operatively coupled to said transformer assembly at the output side thereof and operatively coupled to said local power supply source, said coupling assembly being arranged for operative connection with said power supply assembly to enable at least one of said at least one power supply device to be selectively connectable to at least one of said local power supply source and said transformer assembly at the output side thereof.

12. The system as recited in claim 11, wherein each respective one of said at least one power supply device further includes a plurality of selectively activatable primary winding leads.

13. The system as recited in claim 12, wherein when the voltage level of the source voltage signal provided by said local power supply source substantially equals an operating voltage level of said power supply assembly, the associated input circuit mechanism of each respective one of said at least one power supply device being operatively selectively configured into a parallel circuit connection with said local power supply source via said coupling assembly, and when the voltage level of the source voltage signal provided by said local power supply source does not substantially equal an operating voltage level of said power supply assembly, the associated input circuit mechanism of each respective one of said at least one power supply device being operatively selectively configured into a series connection with said transformer assembly at the output side thereof via said coupling assembly.

14. A system, comprising:

a fuel dispenser assembly having at least one operating voltage level;

a transformer assembly being operative to convert an input voltage signal at an input voltage level into an output voltage signal at an output voltage level; and an input assembly comprising:

a first assembly, responsive to the output voltage signal provided by said transformer assembly, to provide at least one supply voltage signal each having a respective voltage level, and a second assembly arranged to operatively couple said at least one supply voltage signal to said fuel dispenser assembly for operative powering thereof.

15. The system as recited in claim 14, wherein:

said fuel dispenser assembly further comprises a power supply assembly including at least one power supply device each being operative at an associated power supply voltage level;

said first assembly being operative to provide at least one supply voltage signal each having a respective voltage level substantially equal to the respective power supply voltage level of at least one of said at least one power supply device;

said second assembly being arranged to couple each respective one of said at least one supply voltage signal provided by said first assembly to a corresponding one of said at least one power supply device.

16. The system as recited in claim 15, wherein said input assembly further comprises:

a voltage processor; and a switch assembly.

17. A method of powering a fuel dispenser assembly operative, at least in part, at a first voltage level with a power supply source providing voltage at a second voltage level, said method comprising the steps of:

receiving an input voltage signal provided by said power supply source;

converting said input voltage signal into an output voltage signal having a voltage level substantially equal to the first voltage level; and powering said fuel dispenser assembly with said output voltage signal.

18. The method as recited in claim 17, wherein said converting step further comprises the step of:

providing a transformer to operatively perform the voltage signal conversion, said transformer having an input side and an output side.

19. The method as recited in claim 18, wherein said fuel dispenser assembly further comprises a power supply assembly.

20. The method as recited in claim 19, wherein said powering step further comprises the step of:

coupling the output side of said transformer to said power supply assembly.

21. The method as recited in claim 20, wherein said coupling step further comprises the step of:

providing a common node connection.

22. A method of powering a fuel dispenser assembly having at least one operating voltage level, said method comprising the steps of:

converting an input voltage signal at an input voltage level into an output voltage signal at an output voltage level;

processing the output voltage signal to provide at least one supply voltage signal each having a respective voltage level; and powering said fuel dispenser assembly with said at least one supply voltage signal.

23. The method as recited in claim 22, wherein said converting step further comprises the step of:

providing a transformer to perform the voltage signal conversion.

24. The method as recited in claim 23, wherein:

said fuel dispenser assembly includes a power supply assembly; and said powering step further includes the step of operatively coupling the output side of said transformer to said power supply assembly.

25. A method of powering a fuel dispenser assembly including at least one power supply device each being operative at an associated power supply voltage level, said method comprising the steps of:

converting an input voltage signal at an input voltage level into an output voltage signal at an output voltage level;

processing the output voltage signal to provide at least one supply voltage signal each having a respective voltage level substantially equal to the respective power supply voltage level of at least one of said at least one power supply device; and powering said fuel dispenser assembly by coupling each respective one of said at least one supply voltage signal to a corresponding one of said at least one power supply device.

26. The method as recited in claim 25, wherein said converting step further comprises the step of:

providing a transformer to perform the voltage signal conversion.

27. The system as recited in claim 1, wherein the output voltage signal provided by said transformer assembly being suitable for use in powering at least one component of said fuel dispenser assembly.

28. The system as recited in claim 7, wherein the output voltage signal provided by said conversion means being suitable for use in powering at least one component of said fuel dispenser assembly.

29. The system as recited in claim 11, wherein an output signal operatively provided by said transformer assembly at the output side thereof being suitable for use in powering at least one component of said fuel dispenser assembly.

30. The system as recited in claim 14, wherein the output voltage signal provided by said transformer assembly being suitable for use in powering at least one component of said fuel dispenser assembly.

31. The method as recited in claim 17, wherein the output voltage signal being suitable for use in powering at least one component of said fuel dispenser assembly.

32. The method as recited in claim 22, wherein the output voltage signal being suitable for use in powering at least one component of said fuel dispenser assembly.

33. The method as recited in claim 25, wherein the output voltage signal being suitable for use in powering at least one component of said fuel dispenser assembly.

* * * * *